United States Patent
Littrell et al.

(10) Patent No.: US 8,120,310 B2
(45) Date of Patent: Feb. 21, 2012

(54) METHODS AND SYSTEMS FOR CHARGING ELECTRIC VEHICLES USING SOLAR POWER

(75) Inventors: Nathan Bowman Littrell, Gardenerville, NV (US); Kristoffer W. Wickstead, Carson City, NV (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/425,693

(22) Filed: Apr. 17, 2009

(65) Prior Publication Data

US 2010/0141201 A1 Jun. 10, 2010

(51) Int. Cl.
*H02J 7/14* (2006.01)

(52) U.S. Cl. ......... 320/104; 320/101; 320/109; 903/903

(58) Field of Classification Search .................. 320/101, 320/104, 107, 109; 903/903
See application file for complete search history.

(56) References Cited

U.S. PATENT DOCUMENTS

| | | |
|---|---|---|
| 4,090,577 A | 5/1978 | Moore |
| 4,396,006 A * | 8/1983 | Cross, Jr. ............ 126/580 |
| 4,592,436 A | 6/1986 | Tomei |
| 5,296,746 A | 3/1994 | Burkhardt |
| 5,316,101 A | 5/1994 | Gannon |
| 5,512,787 A | 4/1996 | Dederick |
| 5,857,322 A | 1/1999 | Cohn |
| 6,201,181 B1 | 3/2001 | Azzam et al. |
| 6,396,239 B1 | 5/2002 | Benn et al. |
| 6,586,668 B2 | 7/2003 | Shugar et al. |
| 6,758,291 B1 | 7/2004 | Koch |
| 7,338,335 B1 * | 3/2008 | Messano ............... 180/65.22 |
| 7,434,636 B2 | 10/2008 | Sutherland |
| 7,469,541 B1 | 12/2008 | Melton et al. |
| 2002/0153178 A1 | 10/2002 | Limonius |
| 2005/0162121 A1 | 7/2005 | Chan |
| 2008/0203966 A1 * | 8/2008 | Ward ..................... 320/104 |
| 2009/0079161 A1 * | 3/2009 | Muchow et al. ........ 280/400 |

FOREIGN PATENT DOCUMENTS

EP 1768224 A1 9/2004

* cited by examiner

*Primary Examiner* — Edward Tso
*Assistant Examiner* — Aaron Piggush
(74) *Attorney, Agent, or Firm* — Armstrong Teasdale LLP

(57) ABSTRACT

A method for delivering energy to an electric vehicle that includes a charging controller and a battery. The method includes coupling a trailer to the electric vehicle, and electrically coupling a portable solar charging assembly to the charging controller, wherein the solar charging assembly is mounted to the trailer and includes at least one solar panel. The method also includes converting solar energy into electrical energy using the at least one solar panel, and transmitting the electrical energy to the charging controller.

15 Claims, 4 Drawing Sheets

METHODS AND SYSTEMS FOR CHARGING ELECTRIC VEHICLES USING SOLAR POWER

BACKGROUND OF THE INVENTION

The embodiments described herein relate generally to electric vehicle batteries and, more particularly, to methods and systems for use in charging electric vehicle batteries using a portable solar power charging system.

As electric vehicles and/or hybrid electric vehicles gain popularity, an associated need to manage a delivery of electrical energy to such vehicles has increased. Moreover, the increased use of such vehicles has also created a need to effectively deliver energy while the vehicles are away from a residence or while they are off-grid.

At least some known charging stations rely on solar power for charging electric vehicles. For example, at least some known charging stations include a photovoltaic generator trailer that provides power for emergency operations during disaster relief. Moreover, at least some known charging stations that enable solar power charging include solar cells that generate a variable voltage and a converter that converts the variable voltage into a constant voltage that is used to charge storage batteries. Generally, however, such known charging stations are too large to be easily portable during normal use. Moreover, such known charging stations are too large to be towed and, as such, generally cannot be used to extend a range of an electric vehicle because the charging stations would create an extra weight load on the electric vehicle that would reduce the fuel efficiency of the electric vehicle. Rather, such known charging stations are often staged at desired locations, and the electric vehicles must return to the charging stations to receive a charge, as if the charging stations were normal charging points coupled to a power grid.

Accordingly, it is desirable to provide systems for use in delivering energy to an electric vehicle using a portable solar power charging system that may be coupled to an electric vehicle via a trailer hitch and towed behind the electric vehicle on a trailer during normal driving periods.

BRIEF DESCRIPTION OF THE INVENTION

This Brief Description is provided to introduce a selection of concepts in a simplified form that are further described below in the Detailed Description. This Brief Description is not intended to identify key features or essential features of the claimed subject matter, nor is it intended to be used as an aid in determining the scope of the claimed subject matter.

In one aspect, a method is provided for delivering energy to an electric vehicle that includes a charging controller and a battery. The method includes coupling a trailer to the electric vehicle, and electrically coupling a portable solar charging assembly to the charging controller, wherein the solar charging assembly is mounted to the trailer and includes at least one solar panel. The method also includes converting solar energy into electrical energy using the at least one solar panel, and transmitting the electrical energy to the charging controller.

In another aspect, a portable charging system is provided for use with an electric vehicle that includes a charging controller and an electric vehicle battery coupled to the charging controller. The charging system includes a trailer configured to couple to the electric vehicle, and a solar charging assembly mounted on the trailer. The solar charging assembly is electrically coupled to the charging controller to provide electrical energy for use in charging the electric vehicle battery. The solar charging assembly includes at least one solar panel configured to convert solar energy into electrical energy, and a converter coupled to the at least one solar panel, wherein the converter is configured to receive electrical energy from the at least one solar panel, convert the electrical energy into a form that is suitable for charging the electric vehicle battery, and deliver the electrical energy to the charging controller.

In another aspect, a portable electric vehicle charging system is provided. The electric vehicle charging system includes a charging controller, a trailer configured to couple to the electric vehicle, and a solar charging assembly mounted on the trailer and electrically coupled to the charging controller. The solar charging assembly includes at least one solar panel configured to convert solar energy into electrical energy, and a converter coupled to the at least one solar panel. The converter is configured to receive electrical energy from the at least one solar panel, convert the electrical energy into a form that is suitable for charging an electric vehicle battery, and deliver the electrical energy to the charging controller for use in charging the electric vehicle battery.

BRIEF DESCRIPTION OF THE DRAWINGS

The embodiments described herein may be better understood by referring to the following description in conjunction with the accompanying drawings.

DETAILED DESCRIPTION OF THE INVENTION

In some embodiments, as used herein, the term "electric vehicle" refers generally to a vehicle that includes one or more electric motors that are used to provide propulsion to the vehicle. Energy used to propel electric vehicles may come from various sources, such as, but not limited to, an on-board rechargeable battery, and/or an on-board fuel cell. In one embodiment, the electric vehicle is a hybrid electric vehicle that captures and stores energy generated by braking. Moreover, a hybrid electric vehicle uses energy stored in an electrical source, such as a battery, to continue operating when idling to conserve fuel. Some hybrid electric vehicles are capable of recharging the battery by plugging into a power receptacle, such as a general power outlet. Accordingly, the term "electric vehicle," as used herein, may refer to a hybrid electric vehicle or any other vehicle to which electrical energy may be delivered.

In some embodiments, as used herein, the term "trailer" refers generally to a transport conveyance that is designed to be pulled by a vehicle, such as an electric vehicle. Moreover, a trailer may be a portable platform that may be coupled and uncoupled to an electric vehicle. Accordingly, the term "trailer," as used herein, may refer to any rolling platform that may be coupled to an electric vehicle.

In some embodiments, a processor or controller, as described herein, includes any programmable system including systems and microcontrollers, reduced instruction set circuits (RISC), applications specific integrated circuits (ASIC), programmable logic circuits (PLC), and any other circuit or processor capable of executing the functions described herein. The above examples are exemplary only, and thus are not intended to limit in any way the definition and/or meaning of the term processor.

A technical effect of the methods, systems, and apparatus described herein includes at least one of (a) coupling a portable solar charging assembly to a trailer, wherein the solar charging assembly includes one or more solar panels and a power converter; (b) coupling the trailer to an electric vehicle via a trailer hitch; (c) coupling the solar charging assembly to a charging controller within the electric vehicle via a connector; (d) converting solar energy to electrical energy using the solar panel; (e) converting the electrical energy generated by the solar panel into a form that is suitable for charging an electric vehicle battery using the converter; (f) transmitting the electrical energy to a backup battery positioned on the trailer; and (g) upon stopping the electric vehicle or, in some cases, while operating the electric vehicle, initiating a recharge of the electric vehicle battery by transmitting energy from the backup battery to the electric vehicle battery via the charging controller.

Figure 1:
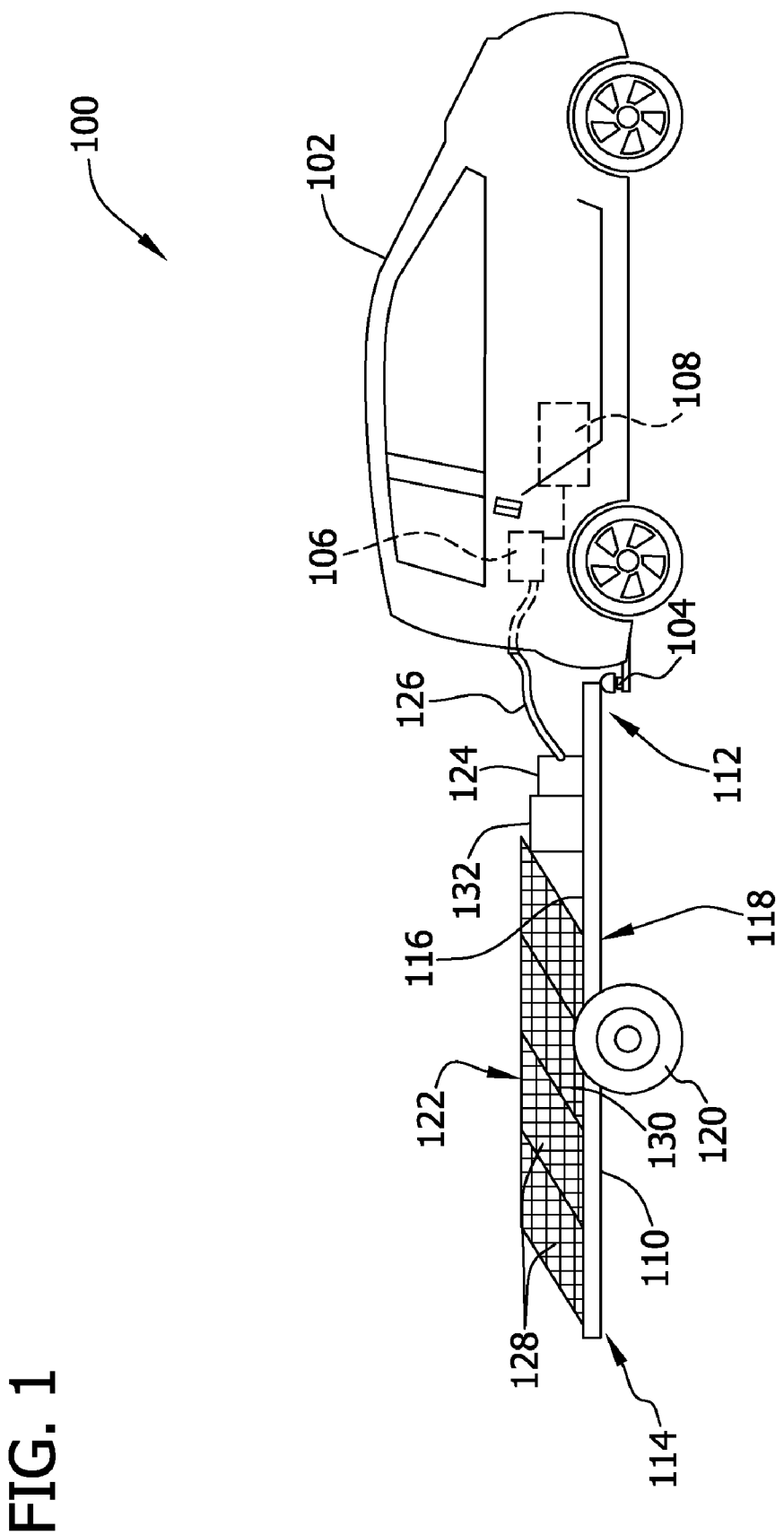
FIG. 1 is a schematic diagram of an exemplary charging system for use with an electric vehicle.
Figure 2:
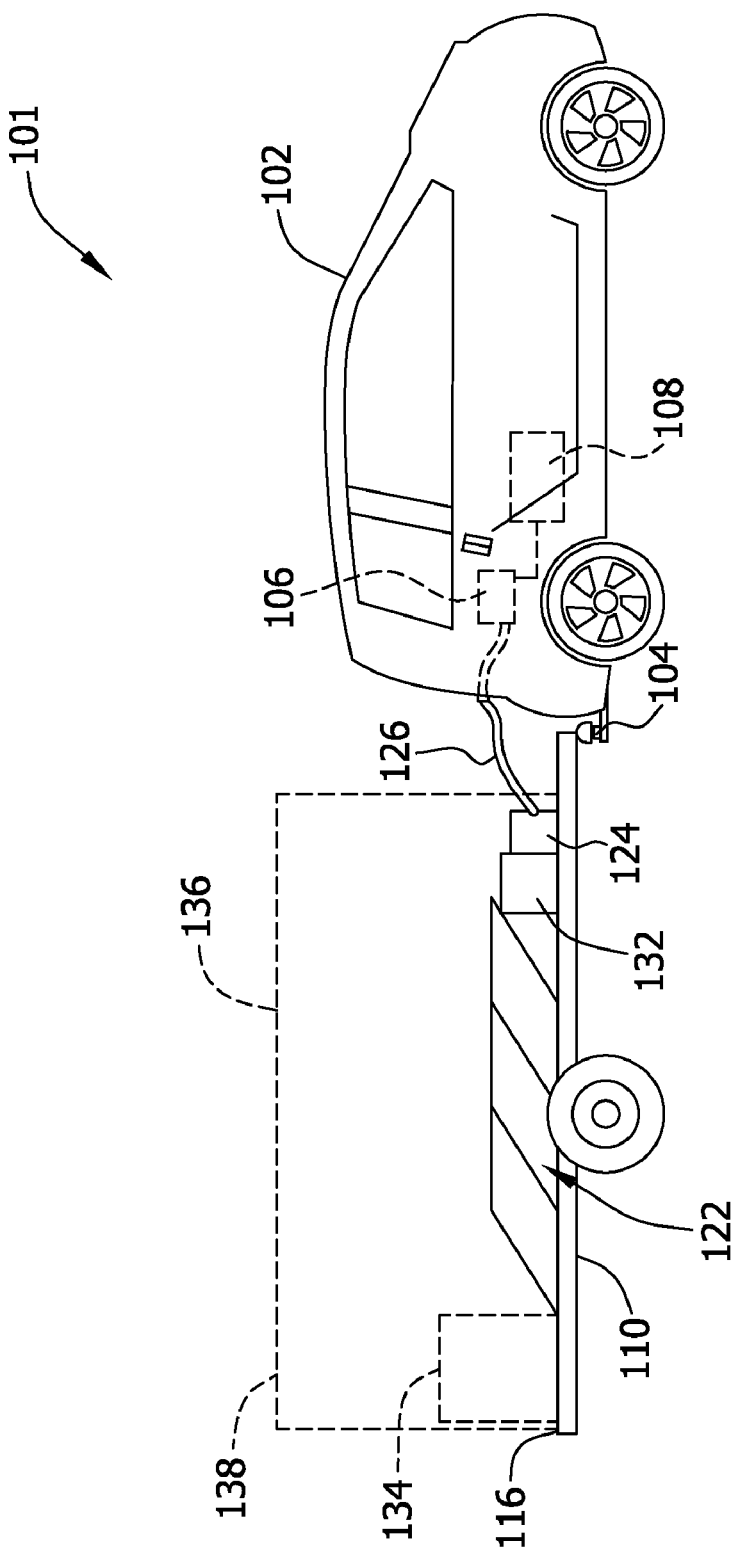
FIG. 2 is a schematic diagram of an alternative embodiment of the charging system shown in FIG. 1.

FIG. 1 is a schematic diagram of an exemplary portable charging system 100 for use with an electric vehicle 102, and FIG. 2 is a schematic diagram of an alternative embodiment of a portable charging system 101. In the exemplary embodiments, electric vehicle 102 includes a trailer hitch 104, a charging controller 106, and a battery 108 that is electrically coupled to charging controller 106. Moreover, in the exemplary embodiments, charging systems 100 and 101 are each self-contained on a trailer 110 that includes a front end 112, a rear end 114, a top surface 116, and a bottom surface 118. Moreover, in the exemplary embodiments, trailer 110 includes a pair of wheels 120. In another embodiment, trailer 110 includes more than one pair of wheels 120. In the exemplary embodiment, trailer 110 couples, such as removably couples, to trailer hitch 104 at front end 112.

Moreover, in the exemplary embodiments, charging systems 100 and 101 each include a solar array 122, a power converter 124 that is electrically coupled to solar array 122, and a connector 126 that couples converter 124 to charging controller 106. In the exemplary embodiments, solar array 122 is coupled to top surface 116 and includes at least one solar panel 128. In one embodiment, solar array 122 includes a plurality of solar panels 128. In the exemplary embodiment, each solar panel 128 includes a plurality of solar cells 130 that convert solar energy into electrical energy. Converter 124 receives electrical energy from solar array 122 and converts the electrical energy into a form that is suitable for recharging a battery, such as electric vehicle battery 108. For example, converter 124 converts a variable voltage generated by solar array 122 into a constant voltage suitable for storage in electric vehicle battery 108. In order to provide the electrical energy to electric vehicle battery 108, converter 124 is electrically coupled to charging controller 106. In one embodiment, charging system 100 includes a backup battery 132 that is electrically coupled to converter 124. In such an embodiment, backup battery 132 is also electrically coupled to charging controller 106. In another embodiment, charging system 100 includes a plurality of backup batteries 132.

As shown in FIG. 2, charging system 101 may also include a storage compartment 134 along at least a portion of top surface 116. Moreover, in the exemplary embodiments, charging systems 100 and 101 also include an enclosure 136. Enclosure 136 is sized to encase components such as, for example, converter 124 and backup battery 132. In one embodiment, enclosure 136 is sized to also house storage compartment 134. Moreover, in one embodiment, solar array 122 may be mounted to a top surface 138 of enclosure 136 rather than, or in addition to, being mounted to trailer 110. Furthermore, in one embodiment, enclosure 136 may be formed with an opening (not shown) extending through top surface 138, and solar array 122 may be sized to be inserted into the opening thus forming top surface. In one embodiment, solar array 122 may be formed integrally within top surface 138 of enclosure 136.

Figure 3:
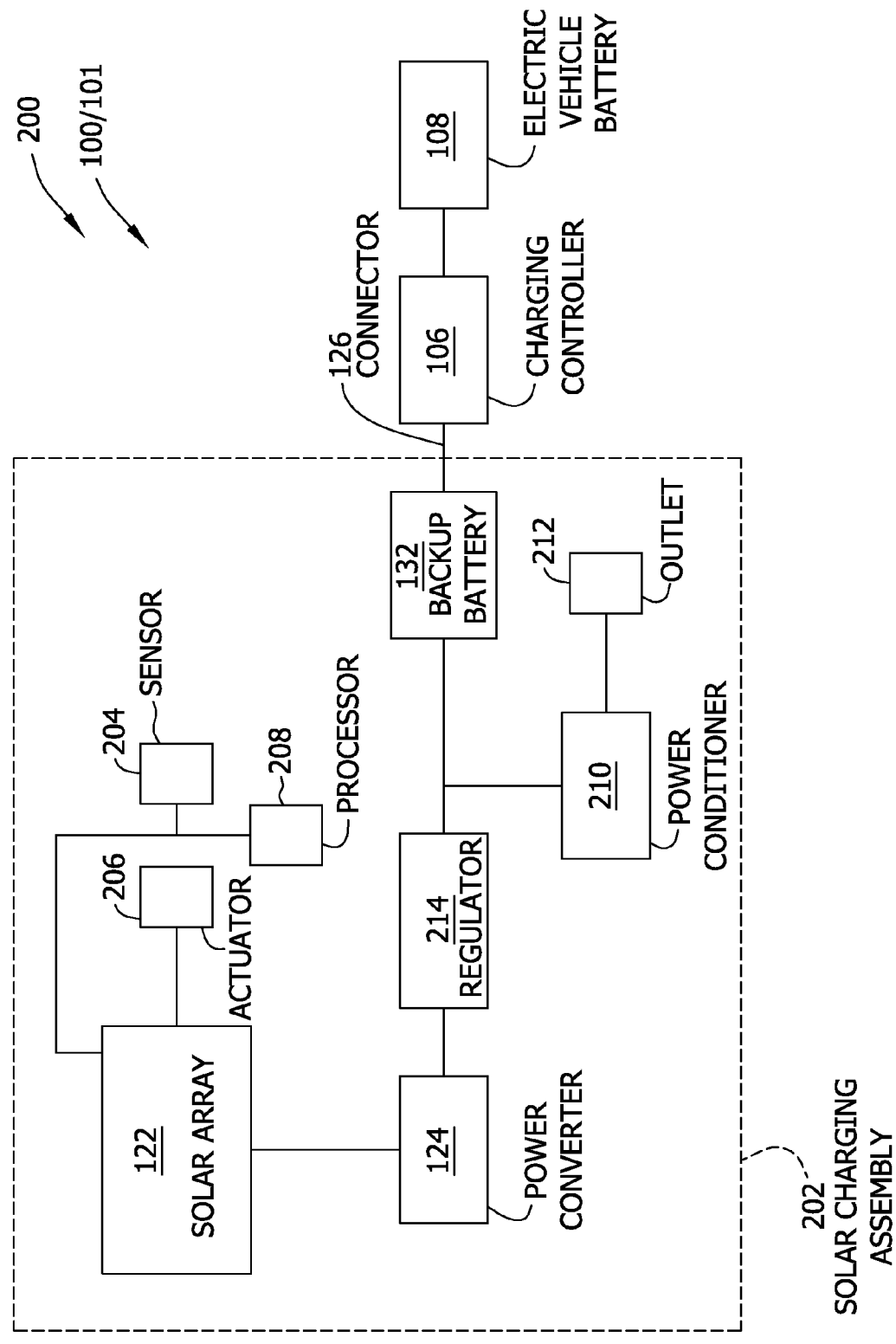
FIG. 3 is a block schematic diagram of an exemplary electrical architecture of the charging systems shown in FIGS. 1 and 2.

FIG. 3 is a block schematic diagram of an exemplary electrical architecture 200 of portable charging systems 100 and 101 (shown in FIGS. 1 and 2) for use in providing energy to an electric vehicle, such as electric vehicle 102 (shown in FIGS. 1 and 2). In the exemplary embodiment, architecture 200 includes a solar charging assembly 202 that includes solar array 122, power converter 124, and connector 126. Moreover, in the exemplary embodiment, connector 126 electrically couples solar charging assembly 202 to charging controller 106 to provide electrical energy for use in charging electrical vehicle battery 108.

In one embodiment, solar array 122 is electrically coupled to a sensor 204 and an actuator 206. Moreover, sensor 204 and actuator 206 are coupled to a processor 208. In such an embodiment, sensor 204 determines an angle of incidence of light rays that strike solar array 122. Sensor 204 generates a signal representative of the angle and transmits the signal to processor 208. Processor 208 determines an whether solar array 122 should be moved, and the extent of any movement necessary, to obtain a normal angle of incidence in order to facilitate enhancing an amount of light rays directly striking solar array 122. Processor 208 transmits a signal to actuator 206, and actuator 206 moves, such as rotates, solar array 122 as necessary to obtain the normal angle of incidence. In one embodiment, this may be an automatic operation. Alternatively, a user may be required to initiate the operation using, for example, a switch (not shown). In another embodiment, processor 208 may include a memory (not shown) that includes a set of data related to a position of the sun on a particular date and/or at a particular time. In such an embodiment, processor 208 may determine the date and/or time, and transmit a signal to actuator 206 to move solar array 122 into a desired position. Moreover, in yet another embodiment, sensor 204 may be, for example, a GPS sensor that determines a location of electric vehicle 102, including a latitude. In such an embodiment, processor 208 may determine a position of the sun based on the latitude, date, and/or time. Processor 208 then transmits a signal to actuator 206 to reposition solar array 122.

Moreover, in one embodiment, within solar charging assembly 202, backup battery 132 is electrically coupled to converter 124. In such an embodiment, backup battery 132 is also electrically coupled to charging controller 106. Furthermore, in one embodiment, solar charging assembly 202 includes a power conditioner 210 that is electrically coupled to converter 124. Alternatively power conditioner 210 may be coupled to backup battery 132. Power conditioner 210 includes an outlet 212 or receptacle that is suitable for electronic consumer products including, but not limited to only including, televisions, radios, computers, satellite receivers, and/or small kitchen appliances. As such, power conditioner 210 withdraws electrical energy from converter 124 and/or backup battery 132 and converts the electrical energy into a form usable by such products. For example, energy may be stored in backup battery 132 as direct current (DC) energy. When drawing energy from backup battery 132, power conditioner 210 converts the energy into alternating current (AC) energy that is suitable for use by such products. In addition, in some embodiments, power conditioner 210 may filter the AC energy to facilitate preventing electrical spikes that may damage such products.

Furthermore, in one embodiment, solar charging assembly 202 includes a regulator 214 that is electrically coupled to converter 124. Alternatively, regulator 214 may be coupled to backup battery 132. Regulator 214 measures and regulates a rate of energy delivery from converter 124 or backup battery 132 to charging controller 106. In one embodiment, connector 126 is electrically coupled to charging controller 106 and is capable of being electrically coupled to a residential unit (not shown), such as a house, mobile home, or recreational vehicle. As such, connector 126 provides electrical energy to the residential unit in order to supplement electrical energy drawn from a power grid (not shown).

During operation, trailer 110 is coupled to trailer hitch 104 (shown in FIGS. 1 and 2), and connector 126 is electrically coupled to charging controller 106. During normal driving, electric vehicle 102 does not depend on energy stored within electric vehicle battery 108, but rather, electric vehicle 102 uses, for example, gasoline, to provide propulsion. However, as electric vehicle 102 uses energy stored within electric vehicle battery 108 while, for example, stopped at a stop light, the amount of stored energy is reduced. Upon arriving at a destination, a driver may activate charging system 100 to charge electric vehicle battery 108. In one embodiment, charging system 100 may begin charging electric vehicle battery 108 automatically when the ignition of electric vehicle 102 is shut off.

In the exemplary embodiment, solar charging assembly 202 converts solar energy into electrical energy before, during, and after being coupled to electric vehicle 102 via trailer 110 and connector 126. In one embodiment, solar charging assembly 202 does not begin converting solar energy into electrical energy prior to being coupled to electric vehicle 102. In another embodiment, solar charging assembly 202 stops converting solar energy into electrical energy after being uncoupled from electric vehicle 102. In the exemplary embodiment, solar panel 128 and, more specifically, solar cells 130, convert solar energy into electrical energy and transmit the electrical energy to converter 124. Converter 124 converts electrical energy into a form that is suitable for charging electric vehicle battery 108. Converter 124 transmits the electrical energy to electric vehicle battery 108 via charging controller 106. In one embodiment, solar charging assembly 202 uses backup battery 132 for temporarily storing the electrical energy. In such an embodiment, converter 124 transmits electrical energy to backup battery 132 for storage until needed to recharge electric vehicle battery 108. As such, in such an embodiment, regulator 214 limits an amount of electrical energy and/or a rate at which electrical energy is transmitted to backup battery 132 for storage. Regulator 214 may also limit a rate of transmission from converter 124 to charging controller 206.

In one embodiment, while electric vehicle 102 is in use, a regenerative braking system (not shown) within electric vehicle 102 may generate electrical energy. In such an embodiment, charging controller 106 may direct the energy to electric vehicle battery 108. When electric vehicle battery 108 reaches a predetermined charge point, charging controller 106 may then direct the energy to backup battery 132 via connector 126.

Moreover, in one embodiment, while electric vehicle 102 is in use, charging controller 106 may enable electric vehicle 102 to draw energy directly from backup battery 132 rather than from electric vehicle battery 108 to facilitate extending a range of electric vehicle 102 between necessary refueling and/or recharging stops. In such an embodiment, charging controller 106 may also direct storable energy from converter 124 to electric vehicle battery 108.

Figure 4:
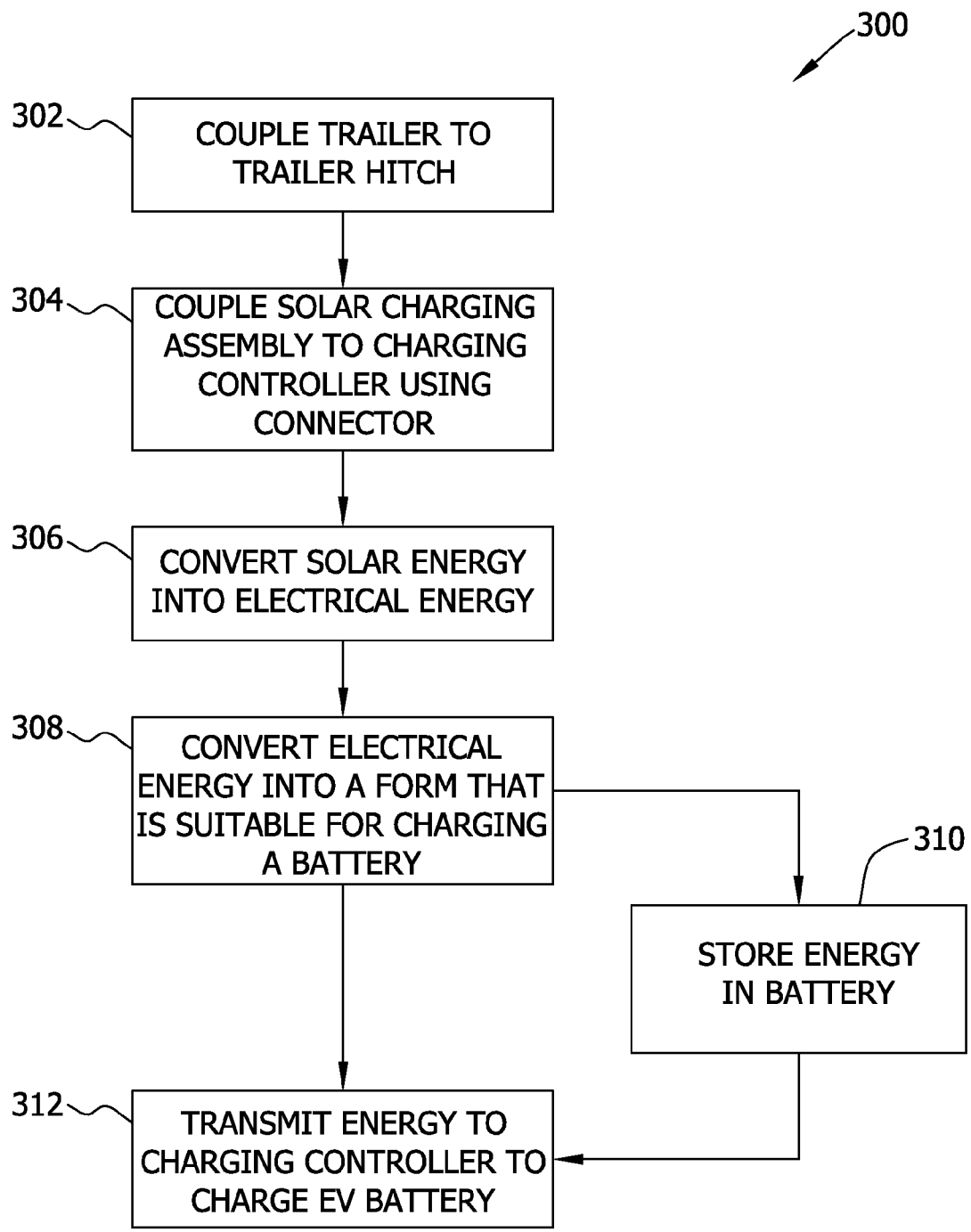
FIG. 4 is a flowchart illustrating an exemplary method for delivering energy to an electric car using the electrical architecture shown in FIG. 3.

FIG. 4 is a flowchart 300 illustrating an exemplary method for delivering energy to an electric car, such as electric car 102 (shown in FIGS. 1 and 2).

In the exemplary embodiment, trailer 110 (shown in FIGS. 1 and 2) is coupled 302 to electric vehicle 102. More specifically, trailer 110 is coupled to electric vehicle 102 via trailer hitch 104 (shown in FIGS. 1 and 2) which positions and secures trailer 110 with respect to electric vehicle 102. In addition, portable solar charging assembly 202 (shown in FIG. 3) is electrically coupled 304 to electric vehicle 102. More specifically, solar charging assembly 202 is coupled to charging controller 106 (shown in FIGS. 1-3) via a connector 126 (shown in FIGS. 1-3). Solar charging assembly 202 provides charging controller 106 electrical energy via connector 126 for use in charging electric vehicle battery 108 (shown in FIGS. 1-3). In one embodiment, converter 124 (shown in FIGS. 1-3) is coupled to charging controller 106. In an alternative embodiment, backup battery 132 (shown in FIGS. 1-3) is coupled to charging controller 106 to provide electric vehicle battery 108 with electrical energy. In another alternative embodiment, regulator 214 (shown in FIG. 3) is coupled to charging controller 106 to monitor and/or regulate an amount of electrical energy provided to electric vehicle battery 108 by converter 124 or backup battery 132.

Moreover, in the exemplary embodiment, solar charging assembly 202 converts 306 solar energy into electrical energy using one or more solar panels 128 (shown in FIGS. 1 and 2) each including a plurality of solar cells 130 (shown in FIG. 1). More specifically, solar panel 128 converts solar energy into electrical energy. Converter 124 receives the electrical energy and converts 308 the electrical energy into a form that is suitable for charging electric vehicle battery 108. In one embodiment, converter 124 stores 310 the electrical energy in backup battery 132. Moreover, in one embodiment, regulator 214 monitors and limits an amount and/or rate of energy stored in backup battery 132 by converter 124. In the exemplary embodiment, converter 124 transmits 312 the electrical energy to charging controller 106 via connector 126 for use in recharging electric vehicle battery 108. In one embodiment, regulator 214 monitors and limits an amount and/or rate of energy transmitted to charging controller 106.

Described herein are exemplary embodiments of methods and systems that facilitate charging an electric vehicle battery while off the power grid using a portable solar charging system. Moreover, enabling battery charging while off the power grid facilitates extending an operational range of the electric vehicle. Extending the operational range of the electric vehicle facilitates making electric vehicles a more attractive buying option for consumers that may wish to travel to remote areas where it may be difficult or impossible to connect to the power grid. Furthermore, lightweight solar charging system, including those described herein, facilitates reducing the amount of added weight that would otherwise cause the electric vehicle battery to be drained of charge more quickly.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other assembly packages and methods.

While the invention has been described in terms of various specific embodiments, those skilled in the art will recognize that the invention may be practiced with modification within the spirit and scope of the claims.

What is claimed is:

1. A method for delivering energy to an electric vehicle that includes a charging controller and a first battery, said method comprising:
coupling a trailer to the electric vehicle;
electrically coupling a portable solar charging assembly to the charging controller using a connector extending between the trailer and the electric vehicle, wherein the solar charging assembly is mounted to the trailer such that the charging assembly remains electrically coupled to the charging controller while the electric vehicle is moving, and wherein the solar charging assembly includes at least one solar panel, a second battery configured to deliver electrical energy to the electric vehicle for one of charging the first battery and providing propulsion power to the vehicle, and a processor coupled to the at least one solar panel;
converting solar energy into electrical energy using the at least one solar panel; and
selectably transmitting the electrical energy to one of the charging controller and the second battery.

2. A method for delivering energy in accordance with claim 1, further comprising:
detecting an angle of incidence of light with respect to the at least one solar panel; and
moving the at least one solar panel as necessary using an actuator to facilitate creating a normal angle of incidence for solar energy gathered by the at least one solar panel.

3. A method for delivering energy in accordance with claim 1, further comprising regulating a rate of energy delivery by the converter to the charging controller.

4. A portable charging system for use with an electric vehicle that includes a charging controller and a first battery coupled to the charging controller, said charging system comprising:
a trailer configured to couple to the electric vehicle; and
a solar charging assembly mounted on said trailer, said solar charging assembly comprising:
a connector extending between said trailer and the electric vehicle, said connector configured to be electrically coupled to the charging controller such that said solar charging assembly remains electrically coupled to the charging controller while the electric vehicle is moving to provide electrical energy for use in charging the first battery;
at least one solar panel configured to convert solar energy into electrical energy;
a processor coupled to said at least one solar panel;
a second battery configured to deliver electrical energy to the electric vehicle for one of charging the first battery and providing propulsion power to the vehicle; and
a converter coupled to said at least one solar panel, said converter configured to receive electrical energy from said at least one solar panel, convert the electrical energy into a form that is suitable for charging the first battery, and selectably deliver the electrical energy to one of the charging controller and said second battery.

5. A portable charging system in accordance with claim 4, wherein said at least one solar panel is moveable to facilitate receiving solar energy at a substantially normal angle of incidence with respect to said at least one solar panel.

6. A portable charging system in accordance with claim 4, wherein said solar charging assembly further comprises a power conditioner coupled to said converter, said power conditioner comprises at least one electrical outlet for powering electrical equipment, said power conditioner is configured to receive the electrical energy from said converter and to condition the electrical energy for use by the electrical equipment.

7. A portable charging system in accordance with claim 4, wherein said solar charging assembly further comprises a regulator configured to regulate a rate of energy delivery by said converter to the charging controller.

8. A portable charging system in accordance with claim 4, wherein said connector is further configured to couple said solar charging assembly to a residential power receptacle to facilitate providing electrical energy to a residence.

9. A portable charging system in accordance with claim 4, further comprising a storage compartment positioned on said trailer with respect to said solar charging assembly.

10. A portable electric vehicle charging system comprising:
a charging controller;
a trailer configured to couple to an electric vehicle, the electric vehicle having a first battery;
a solar charging assembly mounted on said trailer, said solar charging assembly comprising:
a connector extending between said trailer and the electric vehicle, said connector configured to be electrically coupled to said charging controller such that said solar charging assembly remains electrically coupled to said charging controller while the electric vehicle is moving;
at least one solar panel configured to convert solar energy into electrical energy;
a processor coupled to said at least one solar panel;
a second battery configured to deliver electrical energy to the electric vehicle for one of charging the first battery and providing propulsion power to the vehicle; and
a converter coupled to said at least one solar panel, said converter configured to receive electrical energy from said at least one solar panel, convert the electrical energy into a form that is suitable for charging the first battery, and to selectably deliver electrical energy to one of said charging controller for use in charging the first battery and said second battery.

11. A portable electric vehicle charging system in accordance with claim 10, wherein said solar charging assembly further comprises:
a sensor configured to detect an angle of incidence of light with respect to said at least one solar panel; and
an actuator configured to position said at least one solar panel, said processor configured to control said actuator to move said at least one solar panel based on a reading of said sensor.

12. A portable electric vehicle charging system in accordance with claim 10, wherein said solar charging assembly further comprises a power conditioner electrically coupled to said converter, said power conditioner comprises at least one electrical outlet for powering electrical equipment, said power conditioner configured to receive electrical energy from said converter, and to condition the electrical energy for use by the electrical equipment.

13. A portable electric vehicle charging system in accordance with claim 10, wherein said solar charging assembly further comprises a regulator configured to regulate a rate of energy delivery by said converter to said charging controller.

14. A portable electric vehicle charging system in accordance with claim 10, wherein said connector is further configured to coupled said solar charging assembly to a residential power receptacle to facilitate providing electrical energy to a residence.

15. A portable electric vehicle charging system in accordance with claim 10, further comprising a storage compartment positioned on said trailer with respect to said solar charging assembly.

* * * * *